June 12, 1956  R. W. HEWES  2,750,577
SEARCH LIGHT SIGNAL
Filed March 2, 1954  4 Sheets-Sheet 2

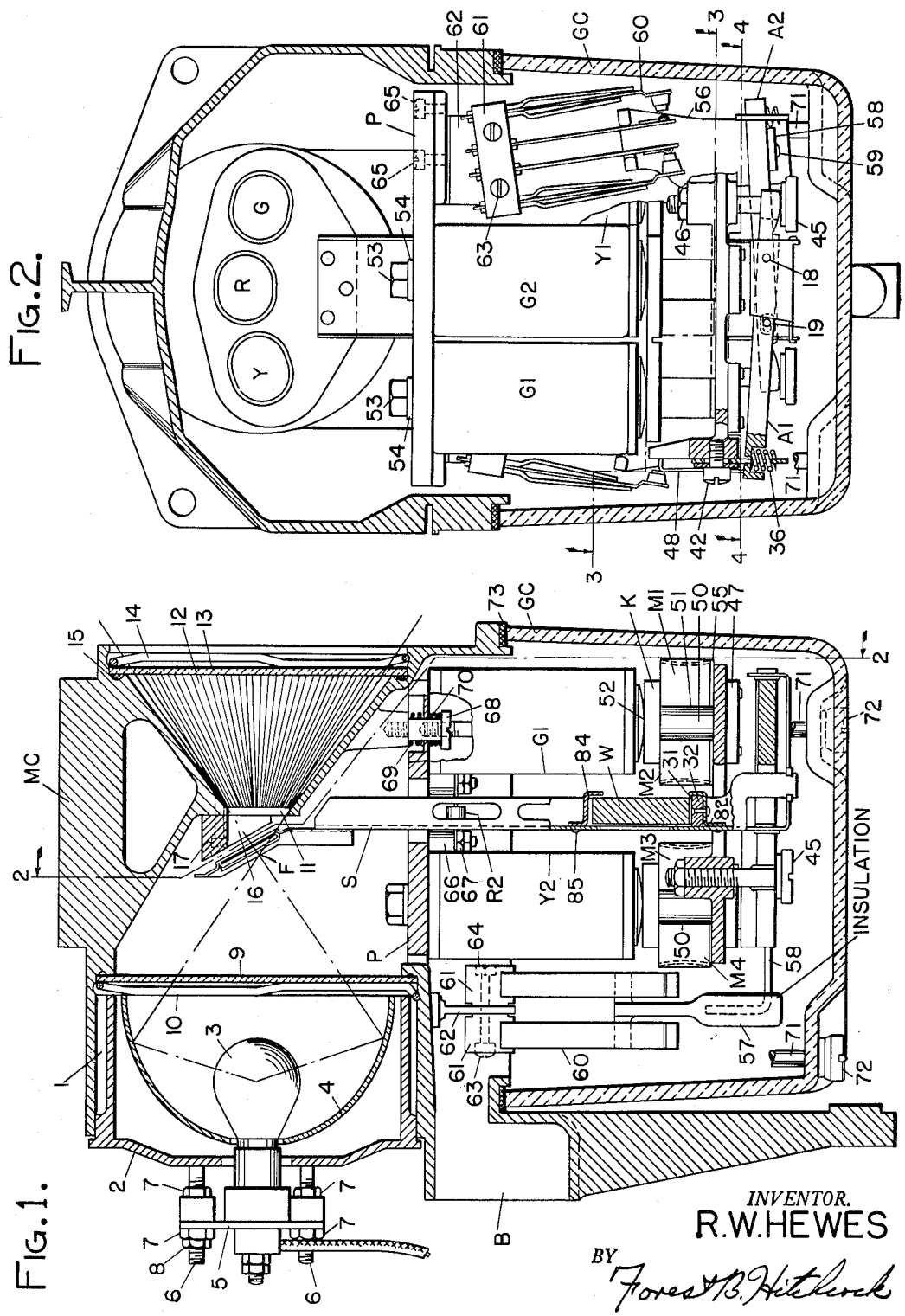

INVENTOR.
R. W. HEWES
BY
Forest B. Hitchcock
HIS ATTORNEY

June 12, 1956 R. W. HEWES 2,750,577
SEARCH LIGHT SIGNAL
Filed March 2, 1954 4 Sheets-Sheet 3
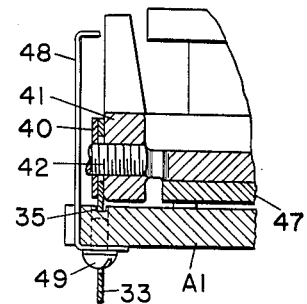
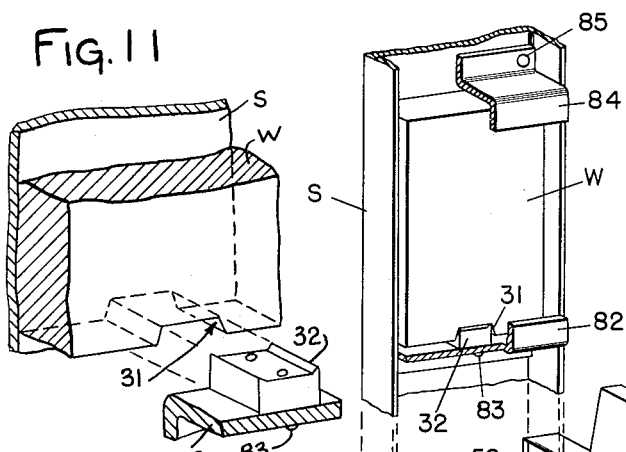
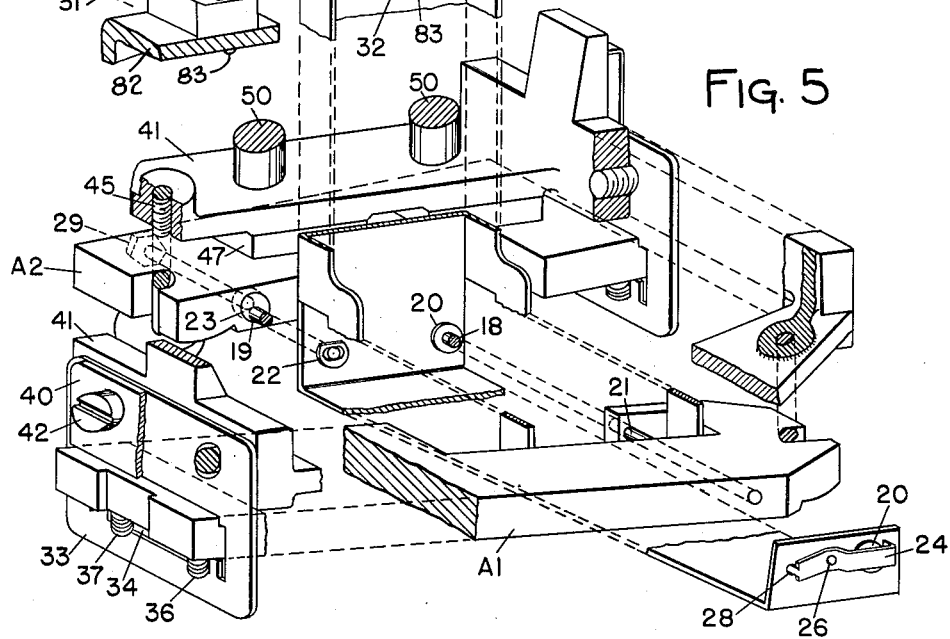
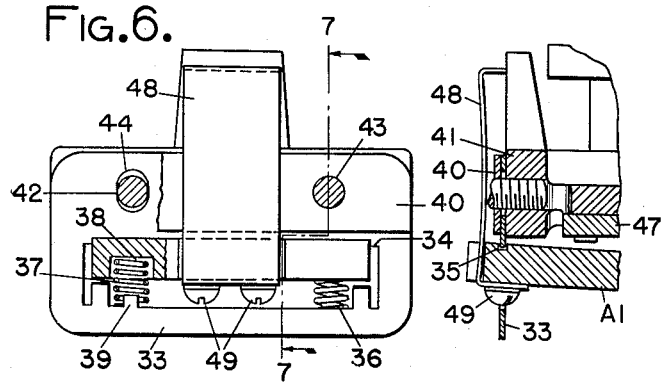
INVENTOR.
R. W. HEWES
BY Forest B. Hitchcock
HIS ATTORNEY

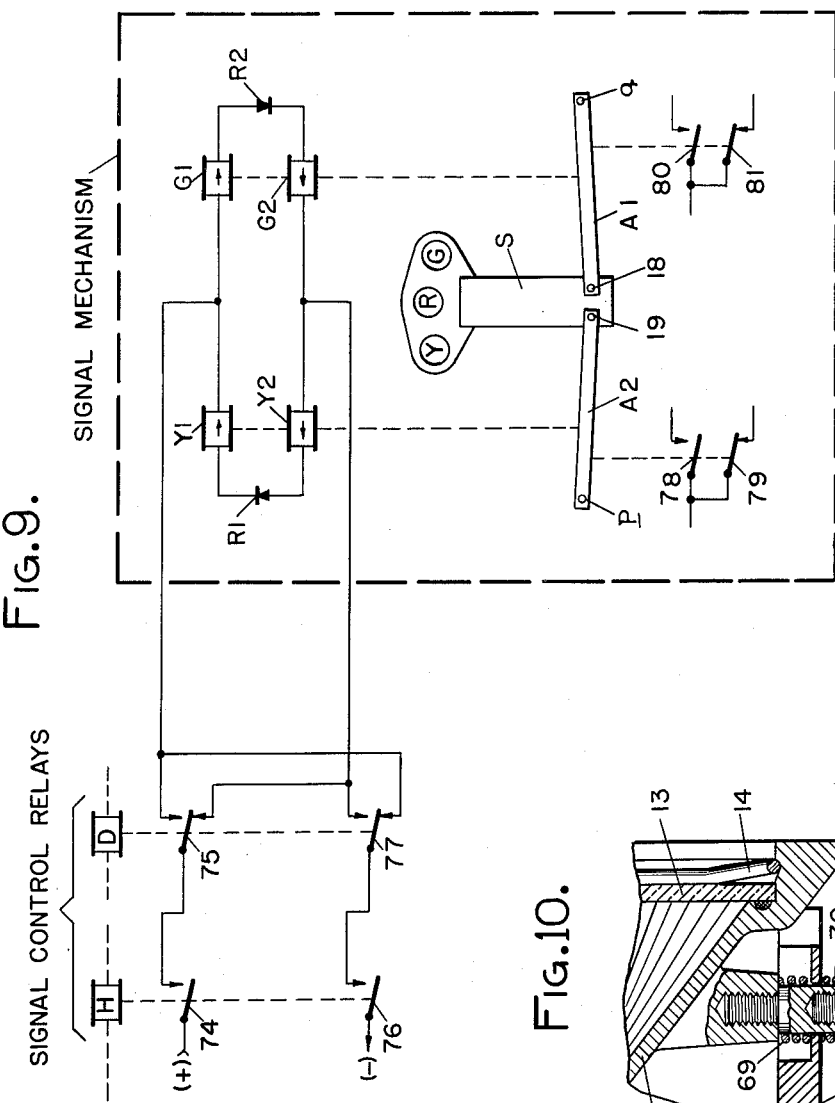
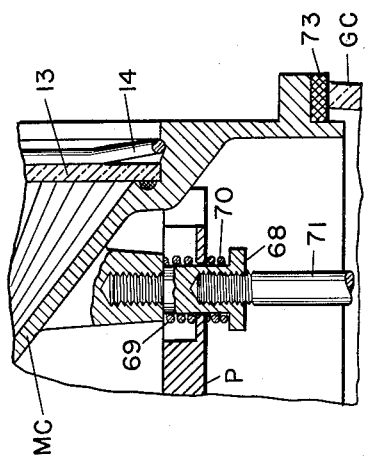

United States Patent Office 2,750,577
Patented June 12, 1956

2,750,577

SEARCH LIGHT SIGNAL

Ralph W. Hewes, Rochester, N. Y., assignor to General Railway Signal Company, Rochester, N. Y.

Application March 2, 1954, Serial No. 413,527

12 Claims. (Cl. 340—50)

This invention relates to light signals, and particularly to signals of the search light type.

More particularly, this invention relates to a search light signal having a spectacle arm provided with color roundels adapted to be selectively interposed in the signal light beam, the spectacle arm being actuated and wholly supported by two armature structures, each of which is a part of an electroresponsive operating device.

A high degree of integrity of signal operation can be obtained by causing the spectacle arm to be dependent on the armatures of the electroresponsive operating devices for support as well as actuation. The omission of additional supporting members for the spectacle arm removes the possibility that the spectacle arm could be retained in any position other than that dictated by armature positions.

An object of this invention is to provide a means for operating the spectacle arm by two polar biased relays which are energized from a polarized control circuit, each relay responding to a polarity opposite to that required for the response of the other.

Another object of this invention is to provide a means for actuating and wholly supporting the spectacle arm by the armature structures of the operating relays.

Another object of this invention is the incorporation into the structure of the spectacle arm of a movable weight which is supported by knife edge bearings.

Another object of this invention is to provide a means for isolating the operating portion of the signal mechanism from the mechanism case and the optical system by shock absorbing structures designed to provide damping action against vibration.

Other objects, purposes and characteristic features of the present invention will be in part obvious from the accompanying drawings, and in part pointed out as the description of the invention progresses.

Figure 3:
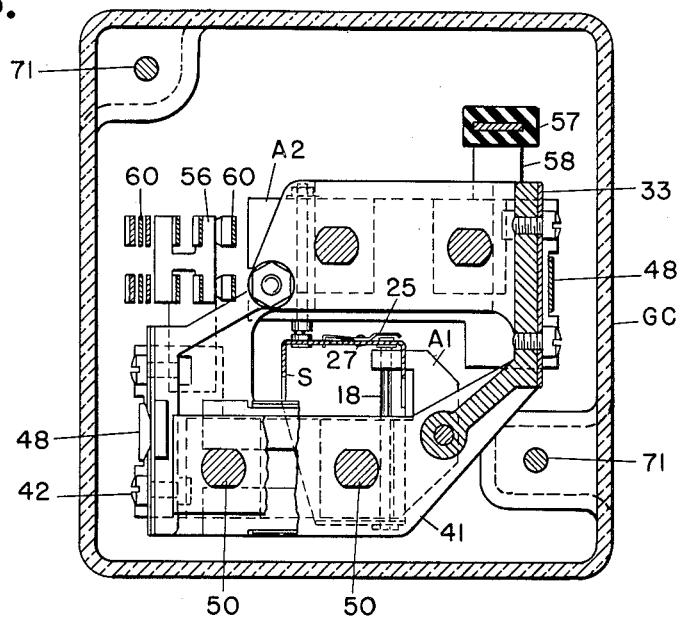
Figure 4:
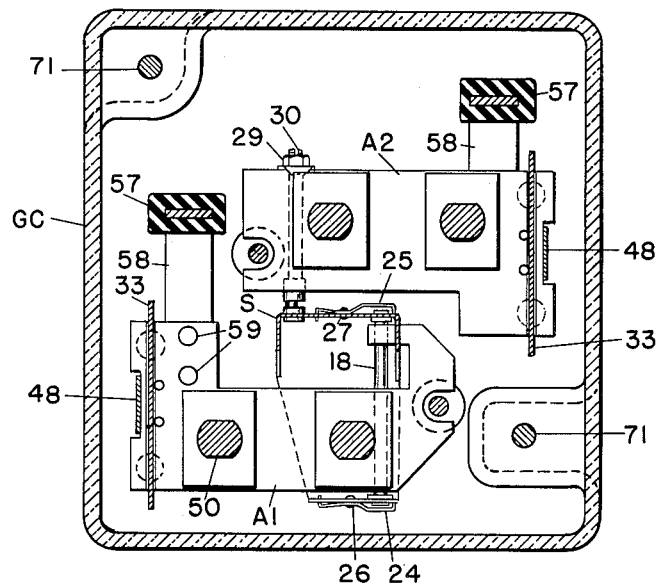

Fig. 1 is a side sectional view of the signal operating mechanism,

Fig. 2 is a sectional view of the signal taken along the line 2—2 of Fig. 1 viewed in the direction of the arrows, Fig. 3 is a sectional view of the signal taken along the line 3—3 of Fig. 2 viewed in the direction of the arrows, Fig. 4 is a sectional view of the signal taken along the line 4—4 of Fig. 2 viewed in the direction of the arrows, Fig. 5 is a perspective view of the signal, showing partly in cross section the structural relation of parts, particularly the relation of the spectacle arm to the two relay armatures, Fig. 6 is a fragmentary sectional view of the signal showing the pivot end of an armature along with a plate and springs used to position and bias the armature, Fig. 7 is a fragmentary sectional view of the signal taken along the line 7—7 of Fig. 6 viewed in the direction of the arrows, showing the position of an armature when the associated relay coils are deenergized, Fig. 8 is a fragmentary sectional view of the signal taken along the line 7—7 of Fig. 6 viewed in the direction of the arrows, showing the position of an armature when the associated relay coils are energized, Fig. 9 is a schematic diagram showing a means of operating the signal mechanism from a control circuit, Fig. 10 is a fragmentary sectional view showing in greater detail that portion of Fig. 1 relating to the shock mounting structure for the signal mechanism, and Fig. 11 is a fragmentary perspective view showing in greater detail a portion of the base of the movable weight and a bearing block for supporting the weight.

Referring now to Figs. 1 and 2 of the drawings, it will be seen that the mechanism case MC has a socket 1 for receiving a barrel 2 carrying a light source 3 and a reflector 4. The light source 3 is held by a lamp socket 5 which is fastened to the barrel 2 and positioned with respect to the reflector 4 by studs 6, nuts 7 and lock nuts 8. A glass cover 9 across the inner opening of the barrel 1 is held in position by a spring 10.

Light from the light source 3 and the reflector 4 converges in a light cone at the focal point F of the reflector 4. Near the focal point F color roundels Y, R or G (yellow, red or green respectively) may be interposed in the light cone by the spectacle arm S. The light cone then passes through an opening 11 in a serrated cone 12 and emerges from the signal mechanism through a glass cover 13 which is held in position by a spring 14 and which bears on an annular rubber gasket 15.

Phantom indications and dilution of the signal beam caused by the reflection of external light are minimized by the serrated cone 12 and the angle of inclination of that portion of the spectacle arm S which contains the color roundels. A shield 16 fastened to the mechanism case MC by a screw 17 minimizes dilution of the signal beam by stray internal light.

The preceding description of an optical system for a searchlight signal is very similar to that disclosed in Field Patent No. 2,376,534, dated May 22, 1945, said patent describing more fully the principles of operation.

The spectacle arm S (see Figs. 1, 2 and 5), a channelled L-shaped member, is supported by pins 18 and 19. Two bearings 20 mounted in the spectacle arm S receive the pin 18, the other extremity of which is received by an opening 21 in the armature A1. A bearing 22 having a horizontally elongated opening is mounted in the spectacle arm S to receive the pin 19, the other extremity of which is received by an opening 23 in the armature A2.

Longitudinal movement of the pin 18 is held to tolerable limits by clips 24 and 25 (see Figs. 4 and 5) which are attached to the spectacle arm S by rivets 26 and 27 respectively. The clip 24 is restrained from rotation about rivet 26 by a segment of the clip which is engaged by an opening 28 in the spectacle arm S. The clip 24 may be disengaged from the opening 28 and rotated about the rivet 26 to permit the removal of the pin 18; the clip 25 functions in an identical manner.

The pin 19 has an eccentric structure and is threaded and slotted at its armature extremity. The pin 19 is threaded into the armature A2 and is retained by a nut 29. The pin 19 may be rotated by the insertion of a suitable tool in slot 30. Rotation of the pin 19 will by eccentric action cause a rotation of the spectacle arm S about the pin 18 as a pivot, thus adjusting the position of the spectacle arm in alignment with the opening 11.

The spectacle arm S is supported in a normally vertical position by pins 18 and 19 and is free to rotate about either pin. Thus, a movement of the armature A1 will be transmitted to the spectacle arm S by the pin 18, the spectacle arm rotating about the pin 19. A movement of the armature A2 will be transmitted to the spectacle arm S by the pin 19, the spectacle arm rotating about the pin 18.

The horizontally elongated opening in bearing 22 precludes binding action against the described rotations of the spectacle arm S.

A weight W (see Figs. 1, 5 and 11) having a bevelled slot 31 in its base is seated on a bearing block 32, the bearing block 32 engaging the bevelled slot 31 in the base of the weight W. The two upper longitudinal edges of the bearing block 32 act as knife edge bearings, one or both of the edges supporting the weight W at all times.

The bearing block 32 is attached to a clip 82 by two rivets 83. The clip 82 and a clip 84 are each attached to the spectacle arm S by two rivets 85. The clips 82 and 84 loosely retain the weight W within the confines of the spectacle arm S, the weight W being free to move within the confines of the spectacle arm S.

When the spectacle arm S assumes its normally vertical position, the weight W will assume a normally vertical seated position on the two knife edges of the bearing block 32. In this normally vertical position the center of gravity of the weight W coincides with the vertical center line of the spectacle arm S. Rotation of the spectacle arm S from the normally vertical position to either of the two alternate positions will cause the weight W to tilt in the direction of rotation, an upper edge of the weight W coming to rest on the side of the spectacle arm S. When the spectacle arm S returns to the normally vertical position, the weight W tilts to a position opposite to that from which it had been at rest and then returns to the normally vertical seated position on the bearing block 32. Thus, the weight W is able to provide damping action to the spectacle arm S when the spectacle arm S returns to its normally vertical position, any tendency of the spectacle arm S to bounce being overcome.

Since the weight W is supported by knife edges, low frictional bearing force is encountered by the weight W during periods of operational displacement.

Movements of the spectacle arm S in relation to movements of the armatures A1 and A2 having been described, a description of the armatures may now be disclosed.

The armature A1 is a steel member retained at the pivot end by a plate 33 (see Figs. 5, 6, 7 and 8). The armature A1 pivots about the upper edge of an opening 34 in the plate 33, the armature being engaged by the plate 33 along a slot 35 in the armature. Bearing of the armature A1 against the pivot edge of the plate 33 is provided by two helical springs 36 and 37 which are received by openings 38 in the armature, the bases of the springs being engaged by projections 39 on the plate 33. The plate 33 along with a plate washer 40 are attached to a base plate 41 by two screws 42 which pass in through openings 43 and 44 in the plates 33 and 40, and which are threaded into the base plate 41. The openings 43 and 44 in the plate 33 are elongated vertically to permit the positioning of the pivot end of the armature A1. The free end of the armature A1 rests on the head of a screw 45 (see Figs. 1 and 2) which is engaged by a threaded opening in the base plate 41 and locked by a lock nut 46. The adjustment of the airgap between the armature A1 and pole shoes 47 is accomplished by the manipulation of the screw 45 and the plate 33.

A plate spring 48 (see Figs. 5, 6, 7 and 8) is attached to the pivot end of the armature A1 by two screws 49. The spring 48 is shaped so that it bears against the base plate 41 only when the armature A1 is in the dropped away position. Thus, a spring force is exerted on the armature A1 which is effective in reducing the energizing current requirements of the electromagnetic structure associated with the armature A1, but which has no effect on other current values for the structure.

The description of the armature A1 applies to the armature A2 with the exception that the pivot end assemblies of the armatures are attached to opposite sides of the base plate 41.

The polar biased electromagnetic structure of which the armature A1 is a part will now be described only in a general manner since it is a structure very similar to that disclosed in Willing et al., Patent No. 2,502,811, dated April 4, 1950, and to which reference may be made for a more detailed explanation of the principles of operation.

Two cores of magnetic material 50 (see Figs. 1 and 2) pass upward through holes 51 in the base plate 41, the pole shoe 47 ends of the cores being riveted to the base plate. The cores 50 then pass upward through a leakage strip of magnetic material K, through spring washers 52 which hold the windings against vibrational movement, through axial openings in windings G1 and G2 and butt against a steel mechanism plate P. The cores 50 are held by threaded bolts 53 which pass downward through openings in the mechanism plate P and are received by threaded axial holes in the cores 50. Lock washers 54 prevent loosening of the bolts 53 by vibration. Two permanent magnets M1 and M2 are positioned against the cores 50 between the pole shoes 47 and the windings G1 and G2 and held by a magnet clip 55. The magnets M1 and M2 are aligned so that like poles abut a common core 50.

A magnetic circuit of normally low reluctance is provided for the external field of the permanent magnets M1 and M2, the circuit consisting of the cores 50, the mechanism plate P and the leakage strip K. A circuit of normally high reluctance parallel to the leakage strip K is provided through the armature A1 and the airgap between the armature and the pole shoes 47.

The windings G1 and G2 are connected in series electrically and serve, when energized, to increase the reluctance of the low reluctance circuit described above. The direction of the magnetic flux produced by the windings G1 and G2 will be determined by the polarity of the energy applied to the windings G1 and G2 by a control circuit. Whenever the polarity of control energy is such that windings G1 and G2 produce a flux in opposition to that produced by the permanent magnets M1 and M2 in the circuit of normally low reluctance described above, the reluctance of the circuit will increase. The armature A1 will close on the pole shoes 47 in the manner of tractive type relay operation to provide a parallel circuit of low reluctance. Whenever the control energy is of the polarity opposite to that described above, the flux produced by the windings G1 and G2 will follow the circuit of normally low reluctance in the same direction as the flux produced by the permanent magnets M1 and M2, the position of the armature A1 remaining unchanged.

A second polar biased relay of which the armature A2 and windings Y1 and Y2 are parts may be described as above with the exception that the relay is biased to respond to control energy of a polarity opposite to that required for the response of the first relay described.

The polar alignment of the permanent magnets associated with the two relays (see Figs. 1 and 2) is such that if the north poles of magnets M1 and M2 abut the core of the winding G1, then the north poles of magnets M3 and M4 abut the core of the winding Y1. Thus, like poles are located toward the center of the mechanism. This arrangement is made to reduce the effects on the operating current values of the two relays produced by interaction between the permanent magnetic circuits.

A half-wave rectifier R2 (see Fig. 1) is connected between and in series with the windings Y1 and Y2. The rectifier R2 is fastened to the mechanism plate P by insulators 66 and nuts 67. Each insulator 66 has a threaded stud at each extremity, one stud to engage the mechanism plate P and the other stud to engage the rectifier R2, the nut 67 and wire leads to the windings Y1 and Y2. Protection against lightning is extended to the rectifier R2 by the windings Y1 and Y2 since the rectifier is located electrically between the windings.

A second rectifier R1 is located between the windings G1 and G2 in the manner described above, the rectifier being shown only in the schematic circuit diagram of Fig. 9. The function of the rectifiers R1 and R2 will be disclosed in a subsequent description of the schematic circuit and operational diagram of Fig. 9.

Each armature A1 and A2 operates a plurality of contacts (see Figs. 1, 2, 3 and 4) by means of arms 56 extending from contact pushers 57 made of an insulating material. A mounting arm 58 extends from each contact pusher 57, the arms being attached to their respective armatures A1 and A2 by rivets 59. Contact assemblies consist of contact fingers 60 held at their fixed ends by insulating plates 61 which are attached together and to a mounting plate 62 by screws 63 and nuts 64. The mounting plates 62 are attached to the mechanism plate P by screws 65. The contact arrangement shown in the drawings is arbitrary depending on the contact requirements of circuits external to the signal mechanism.

External wire connections to the light source 3, to the windings G1, G2, Y1 and Y2, and to the various contacts 60 are not specifically shown but may be terminated on a terminal board covering the opening B (see Fig. 1) in the mechanism case MC, the terminal board being similar to that disclosed in the Field Patent No. 2,097,785, dated November 2, 1937.

The mechanism plate P (see Figs. 1, 2 and 10) is attached to the mechanism case MC by four shouldered studs 68 which pass through openings in the mechanism plate P and thread into the mechanism case MC. The mechanism plate P is free to move vertically over the shouldered studs 68, such motion being restrained by helical springs 69 and 70. The springs 69 have natural frequencies of vibration which differ from those of the springs 70. Thus the mechanism plate P is supported by a shock absorbing spring system which acts as a buffer against the transmission of vibration of the mechanism case MC to the mechanism plate P. The difference in the frequencies of the springs 69 and 70 serves to provide a damping effect on vibrations of the mechanism plate P.

The signal mechanism previously described is made accessible for repair and adjustment by removing a glass case GC. The glass case GC, being transparent, allows inspection of the mechanism. The glass case GC is attached to the mechanism case MC by two mounting studs 71 which thread into the shouldered studs 68, thus fastening the glass case GC to the mechanism case MC. The external extremity of each mounting stud 71 consists of a slotted nut 72 which bears against the glass case GC. A gasket 73 is inserted between the mechanism case MC and the glass case GC.

Referring now to Fig. 9, a control circuit is assumed to consist of two relays H and D which are generally controlled in accordance with traffic conditions in advance of the signal. Contacts 74 and 76 of the relay H and contacts 75 and 77 of the relay D are shown in the positions which they assume when their respective windings are deenergized.

The signal mechanism previously described is shown consisting of the spectacle arm S and two polar biased operating relays. One relay consists of the armature A1 actuated by the windings G1 and G2 which are connected in series with the rectifier R2; the other relay consisting of the armature A2 actuated by the windings Y1 and Y2 which are connected in series with the rectifier R1. The relay winding circuits G1—R2—G2 and Y2—R1—Y1 are connected in parallel. Arrows indicate the direction in which conventional current must flow through the windings to actuate each polar biased relay. The half-wave rectifiers R1 and R2 are shown aligned to conduct conventional currents in the directions required by the respective associated windings.

The rectifiers R1 and R2 function to conserve power in that their electrical alignment permits only one branch of the two parallel winding circuits G1—R2—G2 or Y2—R1—Y1 to be energized for a given polarity of control energy. Should the rectifiers be removed from the circuits both winding circuits G1—R2—G2 and Y2—R1—Y1 would be energized by control energy regardless of polarity. However, the polar biased structure of the relays previously described would permit only one relay to be actuated. The relay winding circuits G1—R2—G2 and Y2—R1—Y1 are both shown deenergized, the respective armatures A1 and A2 assuming their deenergized positions. Contacts 78 and 79 associated with the armature A2 and contacts 80 and 81 associated with the armature A1 are shown in their deenergized positions, such contacts usually being used in the control of external relays and other signals.

Spectacle arm S is shown in the normal vertical position which it assumes when neither operating relay is energized. The red color roundel R is assumed to coincide with the signal light source not shown. Assume that the signal mechanism will display a red aspect when both control relays H and D are deenergized, a yellow aspect when the relay H alone is energized, and a green aspect when both relays H and D are energized. A normal operational sequence will be described in which the signal mechanism will be controlled to display red, yellow and green aspects progressively.

To control the signal mechanism for a red indication, energy is removed by an external means from the control relays H and D. No energy can reach the signal mechanism since the front contacts 74 and 76 are opened. The signal mechanism is deenergized, the spectacle arm S assuming a vertical position to interpose the red roundel R in the signal light beam.

To control the signal mechanism for a yellow aspect, the control relay H is energized by an external means closing the front contacts 74 and 76. Energy will be supplied to the signal mechanism from (+) through front contact 74, back contact 75, winding Y2, rectifier R1, winding Y1, back contact 77, and front contact 76 to (—). Energization of the windings Y1 and Y2 will cause the armature A2 to pivot upward about a pivot P. Force exerted by the armature A2 through the pin 19 will cause the spectacle arm S to rotate clockwise about the pin 18 interposing the yellow roundel Y in the signal light beam.

To control the signal for a green aspect, the control relay D is energized in addition to the relay H by an external means closing the front contacts 75 and 77. Energy will be supplied to the signal mechanism from (+) through front contact 74, front contact 75, winding G1, rectifier R2, winding G2, front contact 77, and front contact 76, to (—). The applied energy will now be of the correct polarity to energize the windings G1 and G2 but of the wrong polarity to maintain energization of the windings Y1 and Y2. The armature A1 will be actuated upward about a pivot $q$ while the armature A2 will drop away about the pivot $p$ to assume its normal position. A counterclockwise rotation of the spectacle arm S will be caused initially about the pin 18 by the downward movement of the armature A2 transmitted to said spectacle arm S by the pin 19. Further counterclockwise rotation of the spectacle arm S about the pin 19 will be effected by the upward movement of the armature A1 transmitted to said spectacle arm S by the pin 18. The spectacle arm S will successively interpose the yellow, red and green roundels in the signal light beam, ending with the interpositioning of the green roundel G.

If both of the armatures A1 and A2 could be picked up simultaneously under abnormal conditions of any kind, the pins 18 and 19 would be raised by equal amounts. Thus, the spectacle arm S would be raised but not rotated, the red R roundels remaining aligned with the opening 11.

The preceding disclosure of a searchlight signal incorporating the described improvements in structural and operating characteristics which constitute the embodiment of this invention is rather specific but is not intended in any manner in a limiting sense. It is understood that various modifications, adaptations and alterations can be applied to meet the requirements of practice without in any manner departing from the spirit or scope of the invention.

Having described my invention, I now claim:

1. In a light signal of the search light type, two independently operable electroresponsive devices, each of said devices having an armature pivotally supported at one end, said armatures being independently operable; a spectacle arm, a first pin, said first pin operatively connecting said spectacle arm to one of said armatures and providing a support for said spectacle arm; a second pin having an eccentric structure, said second pin operatively connecting said spectacle arm to the other of said armatures and providing a support for said spectacle arm, said second pin being rotatable axially when adjusted by external means; locking means for preventing axial rotations of said second pin, and a journal bearing having an elongated opening, said locking means and said journal bearing being located one in said spectacle arm and the other in one of said armatures, said locking means securing one extremity of said second pin, said journal bearing journaling the other extremity of said second pin; whereby movements of said armatures are transmitted to said spectacle arm by said first and second pins, said pins acting to displace and to pivot said spectacle arm, and said second pin being capable when rotated of adjusting the position of said spectacle arm relative to said armatures.

2. In a light signal of the search light type, two independently operable polar biased electromagnetic devices, each of said devices having an armature pivotally supported at one end, said armatures being independently operable; a spectacle arm, a first pin, a second pin having an eccentric structure, said first pin pivotally connecting said spectacle arm to one of said armatures, said second pin pivotally connecting said spectacle arm to the other of said armatures, said pins wholly supporting said spectacle arm; locking means for selectively permitting or preventing rotation of said second pin about its longitudinal axis, said locking means operatively connecting and securing one extremity of said second pin to one of said armatures; and a plurality of journal bearings in said spectacle arm for journaling said first and said second pins, one of said journal bearings having an elongated opening for receiving said second pin; whereby movements of said armatures are transmitted to said spectacle arm by said first and said second pins, said pins acting to displace and to pivot said spectacle arm, said second pin having an eccentric structure being capable when axially rotated of adjusting the position of said spectacle arm relative to said armatures, the elongated opening in one of said journal bearings permitting positional adjustments of said second pin and therefore of said spectacle arm.

3. In a light signal of the search light type, two independently operable electroresponsive devices, each of said devices having a pivotally supported armature, said armatures being independently operable and being disposed in such manner that the respective directions of rotation of said armatures when their associated electroresponsive devices are energized are opposite; a spectacle arm; a plurality of laterally spaced journal bearings in said spectacle arm, one of said bearings having an elongated opening; a first pin and a second pin, said second pin having an eccentric structure, said first and second pins being operatively connected at one end to the respective armatures, said pins being journaled at their other ends in said journal bearings respectively, said second pin being journaled in said journal bearing having an elongated opening, said pins and said journal bearings being disposed in such manner that a rotational movement by one of said armatures causes a rotational movement in the same direction by said spectacle arm; whereby the axial rotation of said second pin changes the position of said spectacle arm relative to said armatures, the elongated opening in one of said journal bearings permitting positional adjustments of said second pin and therefore of said spectacle arm.

4. A device comprising a movable member, means for pivotally supporting and operatively displacing said movable member, a movable weight having a slotted base, said movable weight being retained within the structure of said movable member, and a bearing block attached to said movable member, said bearing block pivotally supporting said movable weight by engaging the slotted base of said movable weight; whereby operational displacements of said movable member cause movements of said movable weight, said movable weight pivoting about said bearing block to assume positions limited by the structure of said movable member.

5. A device comprising a movable member, means for supporting and operatively displacing said movable member, said means pivotally supporting said movable member in such a manner that said movable member is free to move rotationally in a vertical plane, said means being capable when activated of rotating said movable member through small angular displacements from a normal position, said means being capable when deactivated of cooperating with said movable member to return said movable member to its normal position; a bearing block attached to said movable member, said bearing block having two parallel knife edges, said bearing block being positioned so that the knife edges are perpendicular to the plane of rotation of said movable member; and a movable weight having a slotted opening, said movable weight being retained within the structure of said movable member and being supported by the knife edges of said bearing block located within the slotted opening of said movable weight, said movable weight being free to pivot about either of said knife edges to positions limited by the structure of said movable member whenever displacements of said movable member occur.

6. A device comprising, a first armature member, a second armature member, said armature members being independently operable, a movable member operatively connected to said first and said second armature members, a first pin, said first pin operatively connecting said first armature member and said movable member and providing a support for said movable member; a second pin having an eccentric structure, said second pin operatively connecting said second armature member and said movable member and providing a support for said movable member; a plurality of journal bearings in said movable member, one of said journal bearings having an elongated opening, said journal bearings journaling said first and second pins, said second pin being journaled by said journal bearing having an elongated opening; a bearing block having two parallel knife edges, means for rigidly attaching said bearing block to said movable member; and a movable weight having a slotted base, said movable weight being retained within the structure of said movable member and being supported by said bearing block, the knife edges of said bearing block being engaged by the slotted base of said movable weight; whereby movements of said first and said second armature members are transmitted to said movable member by said first and said second pins respectively, said pins acting to displace and pivot said movable member, displacements of said movable member causing said movable weight to pivot about one of the knife edges of said bearing block, said movable weight being seated on both of said knife edges whenever said movable member assumes a normally vertical position; whereby said second pin is capable when turned by adjusting means of adjusting the position of said movable member relative to said armatures, the elongated opening in said journal bearing permitting positional adjustments of said second pin and therefore of said movable member and said movable weight.

7. A light signal of the search light type comprising, two independently operable electroresponsive devices having respective independently operable armatures, each of said armatures being supported at one end by a fixed pivot, said armatures being capable of rotating about their respective fixed pivots in response to energizations of said respective associated electroresponsive devices, a spectacle arm operatively connected to said armatures, said spectacle arm being pivotally supported at laterally spaced points by said armatures jointly, and means for adjusting the spacing between said laterally spaced points, said means being operable to adjust the position of said spectacle arm relative to said armatures.

8. In a light signal of the search light type, two independently operable electroresponsive devices, each of said devices having an armature pivotally supported at one end by a fixed pivot, said armatures being independently operable, a spectacle arm having a plurality of laterally spaced journal bearings, one of said bearings having an elongated opening, two pins operatively connected to said armatures, respectively, and journalled by said journal bearings, respectively, whereby said spectacle arm is pivotally supported by said pins jointly and is rendered responsive to operational movements by said armatures, and adjustment means operable by external means for adjusting the normal position of the one of said pins journalled in said journal bearing having an elongated opening, thereby adjusting the position of said spectacle arm relative to said armatures; whereby said journal bearing having an elongated opening permits pivotal movements by said spectacle arm in response to operations of said armatures and/or said adjustment means.

9. In a light signal of the search light type, two independently operable electroresponsive devices having respective independently operable armatures, each of said armatures being supported at one end by a fixed pivot, said armatures and fixed pivots being disposed in a manner such that the respective directions of rotation of said armatures when their associated electroresponsive devices are energized are opposite, a spectacle arm carrying a plurality of color discs at one end, and connecting means for pivotally attaching the other end of said spectacle arm to said armatures in a manner such that said spectacle arm is pivotally and wholly supported by said armatures jointly.

10. In a color light signal of the search light type, two electromagnetic devices having laterally spaced armatures associated therewith, fixed pivot means at both ends of the armatures on parallel axes, said fixed pivot means at one end being effective to pivot one of said armatures and said fixed pivot means at the other end being effective to pivot the other of said armatures, whereby the armatures have free ends which rotate in opposite directions about their respective pivot points when attracted by the energization of their associated electromagnetic devices, a spectacle arm disposed substantially vertical with respect to said armatures and carrying a plurality of color light discs at one end and having two laterally spaced pivot supports at the other end, and means for operatively connecting one of said pivot supports of said spectacle to the free end of one of said armatures and the other of said pivot supports of said spectacle to the free end of the other of said armatures, whereby the spectacle arm is wholly supported by said two armatures and is rotated in one direction or the other in accordance with the actuation of one or the other of the armatures.

11. In a color light signal of the search light type, two electromagnetic devices located side by side and having laterally spaced armatures respectively associated therewith, each of said devices being a polar biased electromagnetic structure, and said devices having their windings oppositely connected so that one of the armatures is attracted only by one polarity of energization and the other armature is attracted only by the other polarity of energization, fixed pivot means at both ends of the armatures on parallel axes, said fixed pivot means at one end being effective to pivot one of said armatures and said fixed pivot means at the other end being effective to pivot the other of said armatures, a spectacle arm disposed substantially normal to the armatures carrying a plurality of color light discs at one end and having two laterally spaced pivot support points at the other end, and means for operatively connecting said laterally spaced support points to said armatures respectively at points spaced inwardly from said fixed pivot points.

12. In a light signal of the searchlight type, two electroresponsive devices, each of said devices having an armature supported at one end by a fixed pivot and having its other end free to move about such pivot in response to the energization of its electroresponsive device with a particular polarity different than the polarity proper to cause response of the armature of said other electroresponsive device, a spectacle arm carrying a plurality of color discs at one end and two spaced supports at the other end, and means respectively connecting said spectacle arm spaced supports to the free ends of said two armatures for rotation of said spectacle arm in one direction or the other depending upon which of said electroresponsive devices is energized with its particular polarity, said connecting means causing said spectacle arm to be wholly supported by said two armatures jointly.

References Cited in the file of this patent

UNITED STATES PATENTS

| | | |
|---|---|---|
| 773,324 | Hopewell | Oct. 25, 1904 |
| 1,546,729 | Groh | July 21, 1925 |
| 1,981,996 | Fjellstedt | Nov. 27, 1934 |
| 2,022,285 | Hayward | Nov. 26, 1935 |
| 2,155,052 | Byland | Apr. 18, 1939 |
| 2,239,316 | Field | Apr. 22, 1941 |
| 2,373,465 | Douglass | Apr. 10, 1945 |
| 2,598,214 | Borden | May 27, 1952 |